United States Patent [19]

Matsumura et al.

[11] Patent Number: 4,478,982
[45] Date of Patent: Oct. 23, 1984

[54] HIGH NITRILE CONTENT BASED RESIN AND METHOD OF PRODUCING THE SAME

[75] Inventors: Shoichi Matsumura; Yoshihiko Hashimoto; Hiroyasu Furukawa; Masaaki Azuma, all of Hyogo, Japan

[73] Assignee: Kanegafuchi Kagaku Kogyo Kabushiki Kaisha, Osaka, Japan

[21] Appl. No.: 302,182

[22] Filed: Sep. 14, 1981

Related U.S. Application Data

[63] Continuation of Ser. No. 108,471, Dec. 31, 1979, abandoned.

[30] Foreign Application Priority Data

Dec. 30, 1978 [JP] Japan ................................ 53-165055

[51] Int. Cl.³ .......................................... C08F 279/04
[52] U.S. Cl. ..................................................... 525/316
[58] Field of Search ......................................... 525/316

[56] References Cited

U.S. PATENT DOCUMENTS 3,950,455 4/1976 Okamoto ............................. 525/316
4,120,851 10/1978 Chi ...................................... 525/316
4,154,777 5/1979 Shoji ................................... 525/316

Primary Examiner—Paul R. Michl
Attorney, Agent, or Firm—Moonray Kojima

[57] ABSTRACT

A high nitrile content based resin produced by graft polymerizing in the presence of a rubber, a first group of monomers in a first polymerization step, then a second group of monomers in a second polymerization step, wherein the resin comprises (A) 5 to 25 parts by weight of said rubber; (B) 5 to 40 parts by weight of the product of said first polymerization step comprising 30 to 60 weight percent unsaturated nitrile and 70 to 40 weight percent vinyl compound having aromatic vinyl compound as an essential element; and (C) 35 to 90 parts by weight of the product of said second polymerization step comprising 60 to 85 weight percent unsaturated nitrile and 40 to 15 weight percent vinyl compound having aromatic vinyl compound an alkyl methacrylate and/or alkyl acrylate; wherein the resin has higher impact resistance, excellent processability together with the properties of excellent gas barrier and chemical resistance.

13 Claims, No Drawings

4,478,982

HIGH NITRILE CONTENT BASED RESIN AND METHOD OF PRODUCING THE SAME

This is a continuation of application Ser. No. 108471, filed Dec. 31, 1979, abandoned.

BACKGROUND OF THE INVENTION

This invention relates to a high nitrile content based resin and more particularly to a polymer composite with high impact resistance, excellent processibility, excellent gas barrier property and chemical resistance.

In graft polymerizing ethylenical unsaturated nitrile in the presence of a rubber component, the proportion of ethylenic unsaturated nitrile is lower in the first step polymerization product than in the final polymerization product and is higher in the second polymerization product than in the final polymerization product so that the composite is substantially heterogeneous.

The so-called nitrile based resin having a relatively high content of unsaturated nitrile excels in gas barriering property and chemical resistance. Thus, such resin has been used as packaging material and as other industrial material. A copolymer made from acrylonitrile and aromatic vinyl compound is not thermally deformable even at a relatively high temperature. Thus, when it is strengthened with rubber, in particular, its usefullness increases. However, the polymerizability is so widely apart between acrylonitrile and aromatic vinyl compound that when the conventional radical polymerization process is carried out, the compositions produced at an earlier polymerization stage show a considerable difference from the compositions produced at a later polymerization stage As a result, the final product tends to be heterogeneous with lower impact resistance and lower thermal stability.

To be more specific, in conventional radical polymerization process, the highly reactive aromatic vinyl compound is apt to polymerize at an earlier stage to give a copolymer which contains the aromatic vinyl compound richer than the starting material contains, whereas the less reactive acrylonitrile polymerizes at a later stage to give a copolymer which contains a large amount of the acrylonitrile. For this reason, various proposals have been put forth in the art for producing a homogeneous copolymer or for strengthening a copolymer with rubber.

Among the proposed processes, for example, is Japanese Patent Publication No. 33574/1971 which discloses a method wherein an aromatic vinyl compound is added to acrylonitrile steadily in the presence of diene based rubber so as to keep constant the refluxing temperature. Japanese Patent Publication No. 16347/1973 discloses a method wherein monomers composition are gas chromatographically traced in the reaction system and monomers are added to maintain a constant composition, thereby to produce a copolymer with homogeneous composition. However, disadvantageously such a method does not produce a very high yield. In Japanese Patent Publication No. 1950/1974, there is disclosed a method wherein a reactive compound is added to the polymerization system according to the degree of heat evolved.

All of the foregoing proposals have in common alleged production of a uniform copolymer by preliminarily preparing a certain composition of monomer mixture in order that a copolymer may be obtained in the predetermined composition, and while tracing the reaction progress, adding a part of the monomer mixture to the reaction system so as to retain the initial composition. Nevertheless, in these proposals, there have been and are many unresolved problems, such as, the heat evolved during polymerization can hardly be removed on account of the initial amount of monomers put in a reactor being too plentiful. However, the reaction progress has to be continuously monitored. The monomers must be added with great care according to the progress of the reaction. Furthermore, the operation and equipment employed must be complicated to obtain a uniform copolymer. In addition to these deficiencies and difficulties, and regardless of the uniformity of the obtained copolymer, the fluidity of the produced copolymer is substantially deficient.

SUMMARY OF THE INVENTION

Accordingly, the present inventors have made an intensive study to eliminate and improve upon the aforementioned and other deficiencies and disadvantages of the prior art. They have improved the fluidity and impact resistance without adversely affecting the gas barriering property and chemical resistance.

The invention encompasses a process wherein rubber, as defined herein, is graft polymerized with a monomer mixture comprising unsaturated nitrile and aromatic vinyl compound in a first polymerization step, and with a monomer mixture comprising unsaturated nitrile and aromatic vinyl compound in a second polymerization step, wherein the compositions of the two monomer mixtures used in the first and second polymerization steps, respectively, are varied within specified ranges.

The end product is a high nitrile content based resin comprising (A) 5 to 40 parts by weight of the product of the first polymerization step comprising (A-1) 30 to 60 weight percent unsaturated nitrile and (A-2) 70 to 40 weight percent vinyl compound comprising aromatic vinyl compound as an essential element; (B) 35 to 90 parts by weight of the product of the second polymerization step comprising (B-1) 60 to 85 weight percent unsaturated nitrile and (B-2) 40 to 15 weight percent vinyl compound comprising aromatic vinyl compound and alkyl methacrylate and/or alkylacrylate; and (C) 5 to 25 parts by weight rubber.

The rubber, as used herein, comprises at least 50 weight percent 1,3-conjugated diene. The vinyl compound comprises aromatic vinyl compound as an essential element. Up to 80% by weight of the aromatic vinyl compound may be replaced by other vinyl compounds, as discussed below, without decreasing the attainable effect of the invention.

The aromatic vinyl compound content of the vinyl compound (A-2) or (B-2) is preferably not less than 20 weight percent, or more preferably not less than 40 weight percent. One of the most important aspects of this invention is the low proportion of unsaturated nitrile in the first step polymerization product. The present inventors have discovered that to obtain the advantageous fluidity of this nitrile based resin of this invention, it is important that the proportion of unsaturated nitrile be lower in graft polymer than in the polymer.

DETAILED DESCRIPTION OF THE PREFERRED EMBODIMENTS

The rubber, or otherwise called herein 1,3-diene based polymer, may be a single polymer composed entirely of 1,3-diene monomer, or a copolymer composed of at least 50 weight percent 1,3-diene and the remainder one or more monomers which are copolymerizable with the 1,3-diene. Among the 1,3-diene usable for this purpose are 1,3-butadiene, isoprene and chloroprene. The monomers copolymerizable with these 1,3-dienes are exemplified by styrene, substituted styrene, alpha methylstyrene, substituted alpha methylstyrene, acrylonitrile, alkylacrylate, such as methyl ethyl, propyl, and n-butyl acrylate and alkyl methacrylate. These monomers can be used singly or in combination. Moreover, polyfunctional monomers, such as divinylbenzene, polyethylene glycoldimethacrylate, allyl acrylate and the like, are able to be subjected to this copolymerization in order to produce a cross linking structure in a diene based rubber.

In such diene based polymers, there must be contained at least 50 weight percent diene monomer. When less than 50 weight percent 1,3-diene is used, the glass transition temperature of the rubber rises and the impact resistance cannot be sufficiently imparted to the final product. The 1,3-diene based rubber can be produced by various conventional processes. Briefly, any process such as bulk polymerization, solution polymerization, emulsion polymerization and suspension polymerization can be used. The emulsion polymerization is prefered. The mean diameter of the diene based rubber latex is preferably from 0.05 to 0.2 micron. But this range does not limit the latex diameter; other diameters may be used depending upon the circumstances used.

The graft copolymer of this invention can be produced by polymerization of unsaturated nitrile with a vinyl compound in the presence of the diene based rubber. As the unsaturated nitrile, acrylonitrile and/or methacrylonitrile and the like can be used. The vinyl compound of (A-2) and (B-2) comprises at least one aromatic vinyl compound as an essential element thereof. However, up to 80% by weight of the aromatic vinyl compound can be replaced by a vinyl monomer or monomer mixture other than the above which contains not less than 30% by weight of alkylacrylate and/or alkylmethacrylate. In this case, not more than 30 weight percent of the other vinyl monomer, which is not aromatic vinyl compound nor acrylate nor methacrylate, such as vinyl ether, vinyl ester or the like can also be employed in an amount (e.g. 0 to 20 weight percent) so that the desired properties of the inventive resin do not fail.

To be more specific, the aromatic vinyl compounds, such as styrene, substituted styrene, alpha methyl styrene, substituted alpha methyl styrene, and the like can be used. The alkyl radical of alkylacrylate and alkyl methacrylate comprises methyl, ethyl, n-propyl, and n-butyl radicals, and can be used.

The composition of the product of the first polymerization step should contain 30 to 60 weight percent unsaturated nitrile and 70 to 40 weight percent vinyl compound. When the amount of the unsaturated nitrile is less than 30 weight percent, the affinity of the product of the first polymerization step with the product of the second polymerization step becomes inferior, and the impact resistance is reduced. When the amount of unsaturated nitrile is more than 60 weight percent, the processing ability decreases and yellowing coloration gives rise to a problem.

The composition of the product of the second step should contain 60 to 85 weight percent unsaturated nitrile and 40 to 15 weight percent vinyl compound. When the amount of the unsaturated nitrile becomes less than 60 weight percent, the product tends to become weak in chemical resistance. When the amount of unsaturated nitrile is more than 85 weight percent, trouble may arise in the processing.

The amount of rubber contained in the final graft polymer is 5 to 25 parts by weight per 100 parts by weight of the final graft polymer. When the rubber content is less than 5 parts by weight, the impact resistance is insufficient. When the rubber content is more than 25 parts by weight, the gas-barriering and chemical resistance properties are adversely affected.

In making the graft polymer, the first polymerization step product comprises a range of 5 to 40 parts by weight, and preferably 0.4 to 3 times the amount of rubber. When less than 5 parts by weight are used, the processing ability will not be substantially improved. When more than 40 parts by weight is used, the gas barriering ability and the chemical resistance properties will be inferior.

The vinyl compounds used in the first and second polymerization steps should be selected so as not to adversely affect the ability to improve impact resistance.

In this invention, to polymerize the unsaturated nitrile with the vinyl compound in the presence of the conjugated diene containing rubber, any conventional polymerization process may be employed, such as solution polymerization, bulk polymerization, emulsion polymerization, or a combination of these processes. It is advantageous from a practical standpoint, to employ emulsion polymerization. In carrying out emulsion polymerization, it will be advisable to add predetermined amounts of monomers to the reaction system dividedly or continously.

In this way, a latex product is obtained. The latex is then coagulated, rinsed, dried, and then subjected to calendering, blowing, and then molded by injection or extrusion process after applying an antioxidant, a stabilizer, a lubricant, or a pigment according to desire or necessity.

The nitrile based resin thus obtained excels in gas-barriering property, fluidity, chemical resistance and has superior impact resistance. Thus, the inventive resin has a highly practical and commercial value.

The invention will now be further illustrated by actual examples, which examples are not to be construed to be limiting in any way of the invention.

The terms "part" and "percent", as used herein, are in terms of weight, unless otherwise indicated.

EXAMPLE 1

(A) Production of Diene-based Rubber Latex.

|  | Parts |
|---|---|
| 1,3-butadiene | 75 |
| Styrene | 25 |
| Triethylene glycol dimethacrylate | 1.2 |
| t-dodecyl mercaptane | 0.25 |
| semi-hardened soda soap from tallow | 2.0 |
| hydrogenated potassium rhodinate | 1.0 |
| condensed naphthalene sodium sulfonate | 0.2 |
| (ethylene diamine tetraacetato)disodium complex | 0.002 |
| ferrous sulfate hepta hydrate | 0.001 |
| formaldehyde sodium sulfite | 0.1 |
| paramentan hydro peroxide | 0.1 |
| deionized water | 200 |

All the above main and auxiliary starting materials were placed in a tightly sealed pressure reactor and polymerization reaction was carried out at 40° C. for 10 hours with stirring, while oxygen was being exhausted from the system. The conversion rate of the monomers into polymer was 98 percent. Electron micrographs showed that the main diameter of the produced latex was 0.06 micron.

(B) Production of Nitrile-based Resin.

|  | Parts |
| --- | --- |
| Diene-based rubber latex (as dried solid) | 10 |
| GAFAC RE-610 (emulsifier) | 0.5 |
| Sodium dioctyl sulfosuccinate | 1.0 |
| (ethylene diamine tetraacetato) disodium complex | 0.005 |
| deionized water | 200 |
| acrylonitrile | 8 |

All the above materials were placed in a polymerization reactor. While the mixture was being maintained at 60° C. in a nitrogen stream with stirring, 0.12 parts of potassium persulfate was added. Immediately after that, the first monomers group in Table 1 was continuously added to the reaction system extending over 2 hours. After 15 minutes interval, the second monomers group in Table 1 was continuously added thereto extending over 4 hours. The polymerization reaction was finished 30 minutes later. Samplings of a few milliliter of the latex solution were made at certain intervals in order to examine the polymer composition through gas chromatography, which detected the residual monomers and determined the composition of the yielded polymers.

After completion of polymerization, the latex was cooled below 50° C., coagulated with calcium chloride, heat treated at 80° to 90° C., then washed, filtered, and dried. To 100 parts of the powdery resin was added 0.5 parts of di-terbutyl hydroxytoluene. This mixture was made into pellets by an extruder equipped with a vent. Then, the pellets were shaped into an Izod bar to test it at 23° C. The fluidity of the resin was determined by means of a Koka type flow tester (manufactured by Shimadzu Seisakusho, Ltd). The test conditions were as follows: temperature, 220° C.; load, 100 kg/cm$^2$; nozzle diameter, 1.0 mm; nozzle length, 10 mm. From this test, the flow rate of the resin was determined, and the flow index was estimated in units of $10^{-2}$ cc/sec.

(COMPARATIVE EXAMPLE 1)

All the operations and treatments were carried out in the same manner as in Example 1, Step (B), except that the monomer compositions listed in Table 1 as Runs 3,5,6 and 7 were used. It becomes apparent from Table 1 that the Izod and the fluidity results are excellent in the Examples of the Present INvention, whereas they are inferior in the comparative examples.

Also, tests for determining stability of the latex were carried out according to Marlon's method. After cooling the latex, 20 g of pure water was mixed with 80 g of latex. Then, the mixture was rotated for 10 minutes by a stirrer under 1100 ppm and under a load of 15 kg. The test results showed that the latex of runs 3 and 5 were in non-latex states at 3 and 5 minutes, respectively, from the start of rotation, whereas the latex of runs 1,2 and 4 kept the latex state even after 10 minutes.

This means that the presence of methyl methacrylate in the second stage monomers remarkably improved the stability of the latex.

EXAMPLE 2

Using the rubber produced in Example 1, Step (A), the following prescription was made.

|  | Parts |
| --- | --- |
| Diene based rubber latex (dried solid) | 10 |
| GAFAC RE-610 (emulsifier) | 0.5 |
| Sodium dioctyl sulfosuccinate | 1.0 |
| HCl (36% concentration) | 0.1 |
| (ethylene diamine tetraacetato) sodium complex | 0.005 |
| deionized water | 200 |
| acrylonitrile | 8 |

TABLE 1

| Run No. | Composition of 1st monomer group (30 parts) (%) | | | Composition of 2nd monomer group (52 parts) (%) | | | Composition of 1st step polymer (%) | | | Composition of 2nd step polymer (%) | | | Conversion Rate (%) | F.I. | IZOD (kg · cm/cm$^2$) |
| --- | --- | --- | --- | --- | --- | --- | --- | --- | --- | --- | --- | --- | --- | --- | --- |
|  | AN | ST | MMA | AN | ST | MMA | AN | ST | MMA | AN | ST | MMA |  |  |  |
| 1 | 55 | 31.5 | 13.5 | 68.3 | 22.2 | 9.5 | 53 | 33.0 | 14.0 | 70 | 21.0 | 9.0 | 94.0 | 1.5 | 8.0 |
| 2 | 45 | 38.5 | 16.5 | 74.0 | 18.2 | 7.8 | 42.5 | 40.0 | 17.5 | 76 | 16.5 | 7.5 | 93.5 | 2.5 | 4.0 |
| 3* | 50 | 50 |  | 71.1 | 28.9 |  | 48.0 | 52.0 |  | 73.5 | 26.5 |  | 93.8 | 1.7 | 5.5 |
| 4 | 55 | 45 |  | 68.3 | 22.2 | 9.5 | 53.0 | 47.0 |  | 70.0 | 20.5 | 9.5 | 94.0 | 1.9 | 5.0 |
| 5* | 50 | 35 | 15 | 71.1 | 28.9 |  | 48 | 36.5 | 15.5 | 73 | 27.0 |  | 93.5 | 1.6 | 6.0 |
| 6* | 25 | 52.5 | 22.5 | 85.6 | 10.1 | 4.3 | 22.0 | 54.5 | 23.5 | 87.0 | 9.0 | 4.0 | 93.3 | 7.2 | 1.6 |
| 7* | 70 | 21.0 | 9.0 | 59.6 | 28.3 | 12.1 | 67.0 | 23.0 | 10.0 | 63.0 | 26.0 | 11.0 | 95.0 | 0.2 | Unable to mold |

Notes:
To 30 parts of 1st monomer group, 2 parts of n-dodecyl mercaptane (n-DM) was added. AN = Acrylonitrile; ST = styrene; MMA = methyl methacrylate.
*Run Nos 3,5,6 and 7 related to the comparative examples.

All of the above materials were placed in a polymerization reactor. While the mixture was being maintained at 60° C. in a nitrogen stream with stirring, 0.12 parts of potassium persulfate was added. A first monomers group comprising 17 parts AN, 8.1 parts ST and 5.4 parts MMA, and 2.0 parts n-DM was continuously added to the reaction system extending over 2 hours. After 15 minutes interval, a second monomers group comprising 35 parts AN, 9.4 parts ST, and 2.1 parts MMA was continuously added extending over 3.5 hours. Without putting interval, 3.5 parts ST and 1.5 parts MMA were added extending over 1 hour and the reaction mixture was cooled 1 hour later. The later treatment was carried out in the same way as described in Example 1, step (B).

TABLE 2

|  | Composition of 1st polymer | Composition of 2nd polymer | FI | Izod (kg · cm/cm$^2$) |
| --- | --- | --- | --- | --- |
| Example 2 | AN = 54.5, ST = 27.0, MMA = 18.5 | AN = 69.5, ST = 24.0, MMA = 6.5 | 1.0 | 11.6 |
| Comparative Example 2 | AN = 65.0, ST-24.5 |  | 0.3 | unable to mold |

TABLE 2-continued

| Composition of 1st polymer | Composition of 2nd polymer | FI | Izod (kg · cm/cm²) |
|---|---|---|---|
| MMA = 10.5 | | | |

COMPARATIVE EXAMPLE 2

The experiment was carried out in the same way as described in Example 2, except for the following. To 30.5 parts of a monomer mixture comprising 52 parts AN, 17.5 parts St and 7.5 parts MMA, was added 2.0 parts n-DM. This monomer solution was added continuously extending over 2 hours and 46.5 parts of this solution, which was the remainder, was added extending over 3.5 hours. Then, a mixture comprising 3.5 parts S- and 1.5 parts MMA was charged over 1 hour. After 1 hour of polymerization, the mixture was cooled. The results are given in Table 2. With the composition of Comparative Example 2, which was produced without a two step polymerization process, the product was so inferior in fluidity that molding was impossible. Compared with this result, the composition according to the present invention formed a product superior in fluidity and impact resistance. Besides, by changing the n-DM quantity from 2.0 to 4.0 parts in the composition of the comparative example 2, the polymerization was similarly performed; the product showed FI to be 0.8, but the product proved not to be suitable for practical use because of the malodour of the mercaptane.

EXAMPLE 3

Similarly as described in Example 2, the materials including rubber and the other materials were placed in a polymerization reactor. A first monomer mixture (4.2 parts AN, 3.4 parts ST, 3.4 parts MMA, and 0.4 par n-DM) was aded continuously extending over 45 minutes. Immediately after that, a second monomer mixture (47.8 parts AN, 13.6 parts ST and 4.6 parts MMA) was added extending over 4.5 hours. To ⅔ of the second monomer mixture supplied ahead had been added 1.6 parst n-DM. Then, 3.7 parts ST and 1.3 parts MMA was added throughout 1 hour. The mixture was allowed to polymerize for more than 1 hour, and then cooled. Treatment was similarly carried out. The compositions of the first and second polymerization steps were as follows: 1st polymer (AN, 37%; ST, 31.7%; MMA, 31.3%); 2nd polymer (AN, 69%; ST, 23%; MMA, 8%). The flow index (FI) and the Izod number proved to be 2.0 and 6.5 respectively.

The analysis of acetonitrile soluble part of this resin showed that AN, ST and MMA were 67%; 24.4% and 8.6% respectively, and those figures proved to coincide substantially with those of the second step polymer as determined through gas chromatography. The composition of the acetonitrile insoluble part was found to be AN, 38%; ST, 30.5% and MMA, 31.5%. To obtain those results, the quantity of rubber and acetonitrile insoluble part was taken into consideration. In general, the composition of graft polymer was determined through IR and Vibron, in combination with elementary analysis. IR and Vibron analyze the acetonitrile or the dimethylformamide insoluble part to estimate the composition and the quantity of rubber. Elementary analysis gives the result of the composition. According to this conventional analytical procedure, the composition and the quantity of rubber agreed with the experiment. In this way, the nitrile based resin with a particular composition can be obtained in the prescribed amount by the two step graft polymerization method of this invention. A useful nitrile based resin having excellent fluidity, impact resistance, gas barriering property and chemical resistance was produced.

The foregoing description is illustrative of the principles of the invention. Numerous extensions and variation thereof would be apparent to the worker skilled in the art. All such variations and extensions are to be considered to be within the spirit and scope of the invention.

What is claimed is:

1. High nitrile content resin produced by graft polymerizing in two consecutive and separate steps, comprising in a first emulsion polymerization step,
    (B) 5 to 40 parts by weight of a monomer mixture consisting essentially of
        30 to 60% by weight of unsaturated nitrile, and
        70 to 40% by weight of other vinyl compound or compounds containing aromatic vinyl compound as an essential element, is substantially completely polymerized in the presence of
    (A) 5 to 25 parts by weight of rubber in latex containing at least 50% by weight of a component to which 1,3-conjugated diene is polymerized; and in a second consecutive emulsion polymerization step,
    (C) 35 to 90 parts by weight of a monomer mixture consisting essentially of
        65 to 85% by weight of unsaturated nitrile, and
        40 to 15% by weight of other vinyl compound mixture containing aromatic vinyl compound and alkyl methacrylate and/or alkyl acrylate, is substantially completely polymerized onto the graft copolymer obtained in the said first step.

2. A nitrile based resin produced by graft polymerizing in a first emulsion polymerization step, in the presence of a rubber in latex comprising at least 50 weight percent 1,3-conjugated diene, a first group of monomers until said first group of monomers is substantially completely polymerized; and then in a second consecutive and separate emulsion polymerization step, grafting onto the product of said first step, a second group of monomers until said second group of monomers is substantially completely polymerized; said resin produced by said two consecutive and separate steps of polymerization consisting essentially of
    (A) 5 to 25 parts by weight of said rubber consisting essentially of at least 50 weight percent 1,3-conjugated diene, remainder one or more monomers copolymerizable therewith; and
    (B) 5 to 40 parts by weight of said product of said first polymerization step, consisting essentially of 30 to 60 weight percent first component selected from the group consisting of acrylonitrile, methacrylonitrile and mixtures thereof, and 70 to 40 weight percent second component consisting essentially of 20 to 100 weight percent aromatic vinyl compound selected from the group consisting of styrene, substituted styrene, alpha methyl styrene and mixtures thereof, 0 to 80 weight percent of a monomer consisting essentially of 30 weight percent or more alkyl acrylate and/or alkyl methacrylate, and not more than 30 weight percent of vinyl monomers excluding said aromatic vinyl compound, said alkyl acrylate and said alkyl methacrylate; and (C) 35 to 90 parts by weight of said product of said second polymerization step, consisting essentially of 60 to 85 weight percent third component selected from the group consisting of acrylonitrile, methacrylonitrile and mixtures thereof, and 40 to 15 weight percent aromatic vinyl compound selected from the group consisting of styrene, substituted styrene, alpha methyl styrene and mixtures thereof, 0 to 80 weight percent of a monomer consisting essentially of 30 weight percent or more alkyl acrylate and/or alkyl methacrylate, and not more than 30 weight percent of vinyl monomers excluding said aromatic vinyl compound, said alkyl acrylate and said alkyl methacrylate.

3. The resin of claim 2, wherein the product of said first polymerization step, and the product of said second polymerization step are copolymers of acrylonitrile, styrene and methyl methacrylate, and wherein the product of said second polymerization step is the grafting onto the product of said first polymerization step.

4. The resin of claim 2, wherein the product of said first polymerization step comprises a copolymer of acrylonitrile, and styrene; and wherein the product of said second polymerization step comprises a copolymer of acrylonitrile, styrene and methyl methacrylate, grafted onto the product of said first polymerization step.

5. The resin of claim 1, wherein said vinyl compound comprises not less than 20 weight percent aromatic vinyl compound and not more than 80 weight percent monomer or monomer mixtures selected from the group consisting of alkyl acrylate, alkyl methacrylate, and mixtures thereof.

6. The resin of claim 1, wherein said vinyl compound comprises not less than 20 weight percent aromatic vinyl compound and not more than 80 weight percent monomer or monomer mixtures comprising 30 to 100 weight percent of a compound selected from the group consisting of alkyl acrylate, alkyl methacrylate and mixtures thereof, and 0 to 30 weight percent of a compound selected from the group consisting of vinyl ether, vinyl ester or a mixture thereof.

7. The resin of claim 1, wherein the product of said first polymerization step, and the product of said second polymerization step are copolymers of acrylonitrile, styrene and methyl methacrylate.

8. The resin of claim, 1, wherein the product of said first polymerization step comprises a copolymer of acrylonitrile, and styrene; and wherein the product of said second polymerization step comprises a copolymer of acrylonitrile, styrene and methyl methacrylate.

9. The resin of claim 1, wherein said 1,3-conjugated diene is selected from the group consisting of 1,3-butadiene, isoprene and chloroprene; and wherein said 1,3-conjugated diene is copolymerized with less than 50 weight percent of a monomer selected from the group consisting of styrene, substituted styrene, alpha methyl styrene, substituted alpha methyl styrene, acrylonitrile, alkyl acrylate and mixtures thereof.

10. The resin of claim 1, wherein said unsaturated nitrile is selected from the group consisting of acrylonitrile, methacrylonitrile and mixtures thereof; and wherein said aromatic vinyl compound is selected from the group consisting of styrene, substituted styrene, alpha methylstyrene, substituted alpha methyl styrene and mixtures thereof.

11. A method of producing a high nitrile content resin, comprising the sequential steps of
(A) adding to a reaction vessel, a rubber comprising at least 50 weight percent 1,3-conjugated diene, remainder monomers copolymerizable therewith;
(B) adding continuously to said reaction vessel a first monomer mixture comprising 30 to 60 weight percent unsaturated nitrile and 70 to 40 weight percent vinyl compound having at least 20 weight percent aromatic vinyl compound, and causing a polymerization reaction of said first monomer mixture with said rubber;
(C) continuing the polymerization reaction after completing the addition of said first monomer mixture;
(D) adding continuously to said reaction vessel, a second monomer mixture comprising 60 to 85 weight percent unsaturated nitrile and 40 to 15 weight percent vinyl compound having at least 20 weight percent aromatic vinyl compound thereby to polymerize said second monomer mixture with the rubber and first monomer mixture;
(E) continuing the polymerization reaction until competed;
and
(F) after treating the polymerization product to obtain said resin having high nitrile content.

12. The method of claim 11, wherein said unsaturated nitrile is selected from the group consisting of acrylonitrile, methacrylonitrile and mixtures thereof; and wherein said aromatic vinyl compound is selected from the group consisting of styrene, substituted styrene, alpha methyl styrene, substituted alpha methyl styrene and mixtures thereof.

13. The method of claim 11, wherein said 1,3-conjugated diene is selected from the group consisting of 1,3-butadiene, isoprene and chloroprene; and wherein said 1,3-conjugated diene is copolymerized with less than 50 weight percent of a monomer selected from the group consisting of styrene, substituted styrene, alpha methyl styrene, substituted alpha methyl styrene, acrylonitrile, alkyl acrylate and mixtures thereof.

* * * * *